June 12, 1923.
E. B. KIMES ET AL
1,458,344
ADJUSTABLE THRUST BEARING ATTACHMENT FOR CRANK SHAFTS
Filed March 11, 1922
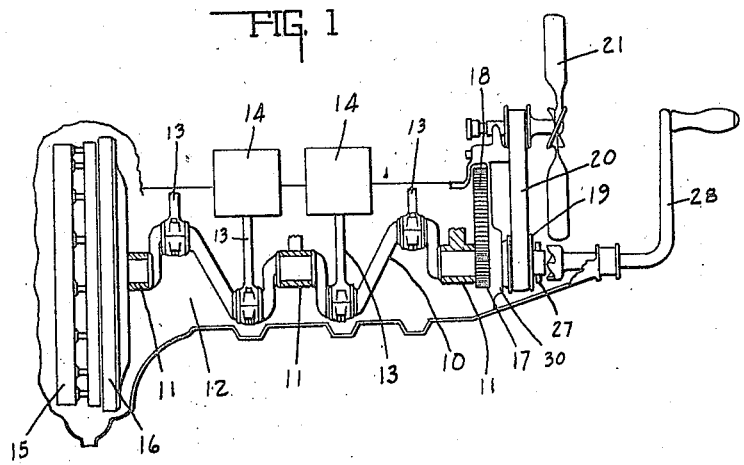
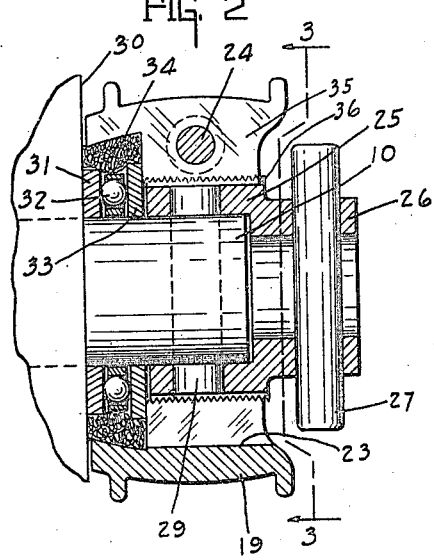
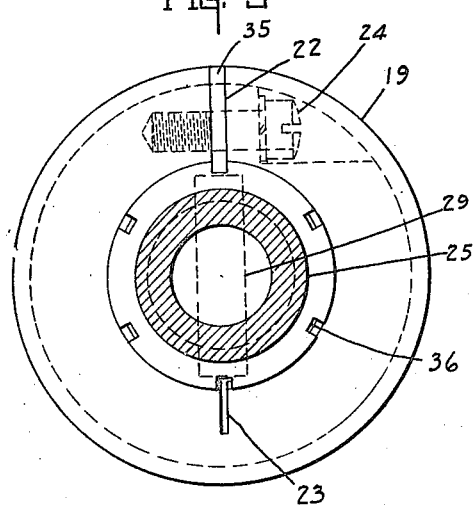
INVENTORS.
ELBERT B. KIMES.
JOHN H. CARSON.
BY
ATTORNEYS.

Patented June 12, 1923.

1,458,344

UNITED STATES PATENT OFFICE.

ELBERT B. KIMES AND JOHN H. CARSON, OF FAIRMOUNT, INDIANA, ASSIGNORS OF ONE-FOURTH TO OLIVER P. BULLER AND ONE-FOURTH TO ROBERT L. KIMES, BOTH OF FAIRMOUNT, INDIANA.

ADJUSTABLE THRUST-BEARING ATTACHMENT FOR CRANK SHAFTS.

Application filed March 11, 1922. Serial No. 543,069.

*To all whom it may concern:*

Be it known that we, ELBERT B. KIMES and JOHN H. CARSON, citizens of the United States, and residents of Fairmount, county of Grant, and State of Indiana, have invented a certain new and useful Adjustable Thrust-Bearing Attachment for Crank Shafts; and we do hereby declare that the following is a full, clear, and exact description thereof, reference being had to the accompanying drawings, in which like numerals refer to like parts.

This invention relates to an adjustable thrust bearing retainer, particularly adapted for adjusting the longitudinal position of the crank shaft for internal combustion engines, and sustaining the end thrust thereof.

In certain types of crank shafts there is provided no end thrust bearing so that there will be a certain amount of end play in the crank shaft developed after severe usage. Because of the present construction there is no way of adjusting the longitudinal position of the crank shaft so as to take up the end play, or provide a suitable end thrust bearing therefor.

By means of this invention the crank shaft may be so adjusted as to eliminate the usual piston side slap, by bringing the connecting rod bearings into proper alignment with the pistons, and wherein the crank shaft is used in connection with that type of motor having the magneto in the fly wheel, the magneto may receive proper adjustment. This also reduces the wear on the bearings and the crystallization of the crank shaft.

The full nature of this invention will be understood from the accompanying drawings and the following description and claims.

In the drawings Fig. 1 is a side elevation showing a crank shaft with the bearing adjusting device positioned thereon. Fig. 2 is a central vertical section through the bearing adjusting device showing a portion of the crank shaft in elevation. Fig. 3 is an end elevation of the adjusting device taken on the line 3—3 of Fig. 2.

In the drawings there is shown the usual crank shaft 10 mounted in the main bearings 11 supported in the crank case 12 to which are connected the connecting rods 13 for driving the pistons 14. The rear end of the crank shaft is secured to the fly wheel 15 which is so constructed as to provide an electric power generating magneto 16. The other end of the crank shaft has secured thereon the gear 17 adapted to drive the timing gear 18, and a pulley wheel 19 for driving the fan belt 20 which in turn drives the fan 21. The fan belt pulley 19 is split radially on one side at 22, and is provided with a radial slot 23 on the other side diametrically opposite the split 22. The inner surface of the pulley is provided with screw threads, and said pulley is also provided with a locking bolt 24 adapted to screw therein through the split 22 for securing the split ends together and varying the diameter of the inner surface for clamping and locking purposes.

Secured on the end of the crank shaft 10 there is a threaded member 25 having an outwardly extending reduced portion 26 through which the crank pin 27 extends. Said crank pin is positioned diametrically therethrough in position to be engaged by the crank 28. The member 25 is locked on the shaft by the pin 29 which extends diametrically through said member and shaft and is of a length less than the diameter of said member so as not to project beyond the threaded surface thereof. Mounted on said crank shaft between the gear case 30 and the member 25, there is an annular washer 31, a ball thrust bearing 32 and an annular washer 33 respectively, said washers and bearing having a lubricating felt washer 34 surrounding their periphery. The pulley 19 is adapted to be screwed over the threaded periphery of the member 25 until its surface engages the washer 33 so as to retain said washers, bearing, and lubricating felt in position between said pulley and gear case. Upon the proper positioning of the pulley upon said member, by screwing the same thereon, and after the proper adjustment of the longitudinal position of the crank shaft has been attained by screwing the pulley on said member against the thrust bearing and casing, the same is locked in position by inserting a removable key 35 between the split ends 22 of the pulley so as to cause it to extend in one of the key slots 36 positioned about the periphery of the threaded member 25. Upon the pulley being thus locked upon said member and the crank pin 27 placed in the end 26 thereof, all end play in the crank shaft bearings and pistons will have been taken up and a thrust bearing provided for reducing further wear.

The invention claimed is:

1. The combination with a crank shaft for an internal combustion engine and a main bearing therefor, of means for providing an end thrust bearing and taking up the end play therein, comprising an externally threaded member adapted to fit over the end of said crank shaft, said member having a plurality of longitudinally extending peripheral slots therein, means for securing said member on said shaft, an internally threaded split fan pulley adapted to screw thereon, a thrust bearing positioned between said pulley and the main bearing, a bolt adapted to extend through the split ends of said last mentioned member for securing them together, and a key adapted to be positioned between said split ends so as to extend into said peripheral grooves for locking said pulley on said member after the end play of said shaft is taken up by the adjustment of the pulley thereon.

2. The combination with a crank shaft for an internal combustion engine and a main bearing therefor, of means for providing an end thrust bearing and taking up the end play therein, comprising an externally threaded member adapted to fit over the end of said crank shaft, said member having a plurality of longitudinally extending peripheral slots therein, an internally threaded split fan pulley adapted to screw thereon, a thrust bearing positioned between said pulley and the main bearing, means for clamping said pulley to said member, and a key adapted to be positioned between said split ends so as to extend into said peripheral grooves for locking said pulley on said member after the end play of said shaft is taken up by the adjustment of the pulley thereon.

In witness whereof, we have hereunto affixed our signatures.

ELBERT B. KIMES.
JOHN H. CARSON.